(12) United States Patent
Buckwalter et al.

(10) Patent No.: US 8,930,259 B2
(45) Date of Patent: Jan. 6, 2015

(54) METHOD AND APPARATUS FOR MONITORING AND EVALUATING LIMIT ORDER TRADING

(75) Inventors: Alan M. Buckwalter, Glen Rock, NJ (US); John P. Xenakis, Red Bank, NJ (US); Pavel Golovinsky, Jersey City, NJ (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/232,667

(22) Filed: Sep. 14, 2011

(65) Prior Publication Data

US 2012/0005067 A1  Jan. 5, 2012

Related U.S. Application Data

(63) Continuation of application No. 10/697,541, filed on Oct. 30, 2003, now Pat. No. 8,041,624, which is a continuation-in-part of application No. 10/246,562, filed on Sep. 18, 2002, now Pat. No. 8,332,303.

(60) Provisional application No. 60/428,462, filed on Nov. 22, 2002.

(51) Int. Cl.
*G06Q 40/00* (2012.01)
*G06Q 40/06* (2012.01)
*G06Q 40/04* (2012.01)

(52) U.S. Cl.
CPC ............... *G06Q 40/06* (2013.01); *G06Q 40/04* (2013.01)
USPC .................................. 705/37; 705/35; 705/45

(58) Field of Classification Search
USPC .......................................................... 705/37
See application file for complete search history.

(56) References Cited

U.S. PATENT DOCUMENTS

| 4,412,287 | A | 10/1983 | Braddock, III |
| 4,674,044 | A | 6/1987 | Kalmus et al. |
| 4,677,552 | A | 6/1987 | Sibley, Jr. |
| 4,823,265 | A | 4/1989 | Nelson |
| 5,168,446 | A | 12/1992 | Wiseman |
| 5,517,406 | A | 5/1996 | Harris et al. |
| 5,873,071 | A | 2/1999 | Ferstenberg et al. |

(Continued)

OTHER PUBLICATIONS

Rule 11Acl-5, Jonathan Katz, U.S. Securites and Exchange Commission, Nov. 17, 2000, pp. 1-68.*

(Continued)

*Primary Examiner* — Hai Tran
(74) *Attorney, Agent, or Firm* — Perkins Coie LLP

(57) ABSTRACT

Systems, methods, apparatus, computer program code and means for generating quality data associated with an option limit order are provided. In some embodiments, an option limit order is received, the option limit order including information identifying a customer, information identifying a desired option, and information that indicates a limit price for said option limit order. A substantially real time feed of option market date is received and the option market data is used in real time to identify at least one of a trade-through and a trade-at transaction relevant to the option limit order. Alerts may be generated based on the identified trade-through or trade-at transaction. Trade-at or trade-through data may be tabulated and analyzed to evaluate option limit order trading activity. Analysis to generate trade-at or trade-through data may be performed on a batch processing basis relying entirely or in part on data received in real time or on a batch basis.

18 Claims, 12 Drawing Sheets

(56) References Cited

U.S. PATENT DOCUMENTS

| | | | |
|---|---|---|---|
| 5,963,923 | A | 10/1999 | Garber |
| 6,016,483 | A | 1/2000 | Rickard et al. |
| 6,029,146 | A | 2/2000 | Hawkins et al. |
| 6,105,005 | A | 8/2000 | Fuhrer |
| 6,131,087 | A | 10/2000 | Luke et al. |
| 6,134,535 | A | 10/2000 | Beltzberg |
| 6,195,647 | B1 | 2/2001 | Martyn et al. |
| 6,247,000 | B1 | 6/2001 | Hawkins et al. |
| 6,278,982 | B1 | 8/2001 | Korhammer et al. |
| 6,317,728 | B1 | 11/2001 | Kane |
| 6,347,307 | B1 | 2/2002 | Sandhu et al. |
| 6,829,589 | B1 | 12/2004 | Saliba |
| 2001/0042040 | A1 | 11/2001 | Keith |
| 2001/0044767 | A1 | 11/2001 | Madoff et al. |
| 2001/0044770 | A1 | 11/2001 | Keith |
| 2001/0051909 | A1 | 12/2001 | Keith |
| 2002/0059107 | A1 | 5/2002 | Reich et al. |
| 2002/0091606 | A1 | 7/2002 | Shapiro |
| 2002/0138401 | A1 | 9/2002 | Allen et al. |
| 2002/0156719 | A1 | 10/2002 | Finebaum et al. |
| 2002/0194115 | A1* | 12/2002 | Nordlicht et al. ............... 705/37 |
| 2003/0130926 | A1 | 7/2003 | Moore et al. |

OTHER PUBLICATIONS

Rule 11Ac1-7, Jonathan Katz, U.S. Securites and Exchange Commission, Nov. 17, 2000, pp. 1-66.*

Trade Execution, What Every Investor Should Know, U.S. Securites and Exchange Commission, Mar. 27, 2001, pp. 1-4.*

"The Striking Price: Pay for Play", (Options Orders: Are you getting the best price?) by Erin E Arvedlund, Barron's New York, N.Y.: May 15, 2000, vol. 80, iss. 20; p. MW10, 1pgs. (retrived from ProQuest Web).*

"Investor Tips: Trade Execution," U.S. Securities and Exchange Commission, retrieved from <http://www.sec.gov/investor/pubs/tradexec.html> on Sep. 25, 2003, 4 pgs.

"SRO Rulemaking, Supplementary Material: Chicago Board Options Exchange Options Linkage Plan," U.S. Securities and Exchange Commission, Jan. 19, 2000, retrieved from <http://www.sec.gov/rules/extra/cboe.htm> on Sep. 25, 2003. 29 pages.

"Trade Execution: What Every Investor should know," from www.sec.gov, Printed on Feb. 13, 2008.

Chicago Board Options Exchange Website, http://web.archive.org/web/20001217040300/www.cboe.com/education/basics.htm, Printed on Aug. 15, 2007.

Louis, Brian, "Options Linkage Plan Won't Provide Instant Solution," The Street.com, Jul. 28, 2000, retrieved from <http://www.thestreet.com/pf/stocks/brokerages/1019385.html> on Sep. 25, 2003. 2 pgs.

Peter Chapman, "Quality Control at Mother Merrill: Spending Big Bucks to Obtain Best Execution," Traders Magazine, Mar. 2000. Retrieved Oct. 8, 2010, from Banking Information Source.

Rini, Bill et al., "Subject: Trade-Order Routing and Payment for Order Flow," The Investment FAQ, Last-Revised Nov. 25, 1999, retrieved from <http://invest-faq.com/articles/trade-order-routing.html> on Sep. 25, 2003. 5 pgs.

Rule 11Ac1-5, Jonathan Katz, U.S. Securities and Exchange Commission, Nov. 17, 2000, pp. 1-68.

Rule 11Ac1-7, Jonathan Katz, U.S. Securities and Exchange Commission, Nov. 17, 2000, pp. 1-66.

Arvedlund, Erin E., "The Striking Price: Pay for Play," Barron's, vol. 80, Issue 20, 2 pages, May 15, 2000.

Editorial Staff, "Trade Monitoring Professionals," Traders Magazine, 3 pages, Aug. 1, 2001.

* cited by examiner

| ORDER IDENTIFIER 602 | TIME ORDER RECEIVED 604 | ORDER TERMS 606 | CUSTOMER INFORMATION 608 | ALERT(S) 610 | QUANTITY FILLED 612 |
|---|---|---|---|---|---|
| LO1001 | 10/06/02 09:33:17 | Sell 25 INQ Apr 130 Call at 5 | C1001 | A2001 | ALL |
| LO1002 | 10/06/02 09:44:53 | Buy 10 QQQ Apr 34 Call at 12 | C1001 | A2002 | NONE |
| LO1003 | 01/07/02 09:55:27 | Buy 10 QQQ Apr 35 Put at 7 | C1001 | A2003 | 5 |

File    Edit    View    Tools    Help

| New Records ▼ | Cust. C1001 ▼ | | SUBSCRIPTION | | | | | | | | | | | | — 620 |

— 622

| Ex Time | Contracts | Symbol | Side | Root | Type | Ex Month | Strike | Ex. Price | Ex. Exch | Best Price | Best Exch | $$ Value | Fast Mkt | Alert Reas | Ord Time | Order Price | Otd Contacts |
|---|---|---|---|---|---|---|---|---|---|---|---|---|---|---|---|---|---|
| 93031a | 10 | QQQ | Buy | QQQ DI | Call | Apr | 35 | 0.85 | ISE | 0.80 | PCX | 50.00 | | Ex alert | 12:00a | | |
| 93031a | 5 | QQQ | Sell | QAV DH | Call | Apr | 34 | 1.30 | ISE | 1.35 | ISE | 25.00 | | Ex alert | 0101a | | |
| 93038a | 30 | QQQ | Buy | QAV DF | Call | Apr | 32 | 3.00 | ISE | 2.95 | AMEX | 150.00 | | Ex alert | 0700a | | |
| 93049a | 10 | QQQ | Buy | QQQ EK | Call | May | 37 | 0.75 | ISE | 0.70 | PCX, CBOE | 50.00 | | Ex alert | 0715a | | |
| 935623a | 10 | QQQ | Buy | QQQ PI | Put | Apr | 35 | 1.10 | ISE | 1.05 | CBOE | 50.00 | | Ex alert | 0800a | | |
| 101650a | 2 | QQQ | Sell | VZQ AX | Call | Jan | 50 | 0.35 | ISE | 0.40 | PCX | 10.00 | | Ex alert | 0930a | | |

— 624

Reason(s)

☐ Bettered NBBO    ☐ Late Print
☐ Trade Processed  ☐ Opening
☐ Flr Brok Discretion  ☐ Price Improvement
☐ B/D              ☐ Other
☐ Fast Mkt
☐ Cross/locked Action    Ex Firm    Contra Firm(s)    Detail ☐ Matched NBBO
☐ Price not Corrected Branch / #

[Submit]

Screen 620 — Processed ▼ Cust. C1002 ▼ SUBSCRIPTION

File  Edit  View  Tools  Help

Table 622:

| Ex Time | Action | Contracts | Symbol | Side | Type | Ex Month | Strike | Ex. Price | Ex. Exch | Best Price | Best Exch | $$ Value | Reasons | Ex. Firm |
|---------|--------|-----------|--------|------|------|----------|--------|-----------|----------|------------|-----------|----------|---------|----------|
| 100610a | Not matched | 1 | QQQ | Sell | Call | Apr | 35 | 0.65 | ISE | 0.70 | CBOE | 5.00 | B/D, Other | Redi |
| 101353a | Not matched | 1 | QQQ | Buy | Call | Apr | 35 | 0.70 | ISE | 0.65 | AMEX | 5.00 | B/D, Other | Redi |

624 —

Action | Reason(s)

Matched NBBO:
- [ ] Bettered NBBO
- [ ] Trade Processed
- [ ] Flr Brok Discretion
- [x] B/D
- [ ] Fast Mkt
- [ ] Cross/locked Price not Corrected:
- [ ] Late Print
- [ ] Opening
- [ ] Price Improvement
- [x] Other Ex Firm | Contra Firm(s) | Detail

| Redi |   |   |
|------|---|---|
| Branch / # |   |   |
| VLS |   |   |
| 5 |   |   |

[Submit]

METHOD AND APPARATUS FOR MONITORING AND EVALUATING LIMIT ORDER TRADING

RELATED APPLICATIONS

This application is a continuation of and claims priority under 35 U.S.C. §120 to U.S. patent application Ser. No. 10/697,541, filed Oct. 30, 2003, for "Method and Apparatus for Monitoring and Evaluating Limit Order Trading," issued as U.S. Pat. No. 8,041,624 on Oct. 18, 2011, which is based on, and claims priority to, U.S. Provisional Patent Application No. 60/428,462, filed Nov. 22, 2002, for "Method and Apparatus for Monitoring and Evaluating Limit Order Trading," and is a continuation-in-part of co-pending and commonly assigned U.S. patent application Ser. No. 10/246,562, filed Sep. 18, 2002, for "Method and Apparatus for Monitoring and Evaluating Trade Activity". U.S. patent application Ser. No. 10/697,541 is related to commonly-assigned U.S. patent application Ser. No. 10/246,561, filed Sep. 18, 2002, for "Method and Apparatus for Processing and Routing Transactions," issued as U.S. Pat. No. 8,140,420 on Mar. 20, 2012, which claims priority to U.S. Provisional Patent Application No. 60/365,040, filed Mar. 15, 2002. The contents of the above referenced patent applications and provisional patent applications are incorporated by reference herein in their entirety.

FIELD

The present invention relates to the monitoring and evaluation of transactions. More particularly, embodiments of the present invention relate to systems, methods, apparatus, computer program code and means to monitor and evaluate trading of options limit orders.

BACKGROUND

In the United States, exchange-trading of options has existed in a standardized, regulated marketplace since the 1970's. An option is essentially a contract giving a buyer the right, but not the obligation, to buy or sell shares of an underlying security at a specific price for a specific time. Since the 1970's a number of exchanges have been formed, including the Chicago Board Options Exchange (the "CBOE"), the American Stock Exchange (the "AMEX"), the Pacific Stock Exchange (the "PCSE"), the International Securities Exchange (the "ISE"), and the Philadelphia Stock Exchange (the "PHLX"). In general terms, four specifications describe an options contract: the type of the option (e.g., a put or a call), the premium (or the initial amount paid on the contract), the underlying security (or the security, such as an equity, which must be delivered or purchased if the option is exercised), and a contract expiration date. As is the case for other types of market-traded securities such as stocks and bonds, a customer's order to buy or sell options may be a "market order" or a "limit order". A market order does not specify the desired price, but rather obligates the broker to obtain the best available price as determined by market conditions. A limit order specifies the price (the "limit price") at which the customer desires the transaction to be executed, and obligates the broker to execute the transaction at the specified price or better if market conditions allow, and not to execute the transaction if market conditions do not allow execution at the specified price.

An order to buy or sell options typically also specifies the number of contracts to be bought or sold. In the case of a limit order, a "partial fill" occurs when it is possible to execute at the limit price some portion but less than all of the number of contracts specified in the limit order.

Unlike other exchange-traded securities, which can generally be traded on equal terms at any exchange, many options trade differently at different exchanges. The variations can include differences in price, execution time, liquidity, etc. For example, an option whose underlying security is IBM Corp. stock may be traded on several exchanges. However, at any given time, there may be slightly different order pricing and execution characteristics associated with trades at different exchanges. Because the various options trading exchanges are not linked, situations known as "trade-throughs" and "trade-ats" may occur. In these situations a limit order remains unfilled at one exchange, even though a transaction occurred at another exchange at a better or equal price.

In the future, it is possible that each of the different exchanges will enter into linkage agreements; but until then this fragmented market continues to make it difficult for options customers to obtain best execution of their orders and to assess the performance of their brokers in executing their orders. It would be desirable to provide a system to monitor and evaluate trading activity in option limit orders which overcomes deficiencies associated with existing trading systems.

SUMMARY

To alleviate problems inherent in the prior art, embodiments of the present invention introduce systems, methods, apparatus, computer program code and means for generating quality data associated with an option limit order are provided. In some embodiments, an option limit order is received, the option limit order including information identifying a customer, information identifying a desired option, and information that indicates a limit price for the option limit order. A substantially real time feed of option market data is received and the option market data is used in real time to identify at least one of a trade-through and a trade-at transaction relevant to the option limit order.

In some embodiments, an alert is generated on the basis of the identified trade-through or trade-at transaction.

In some embodiments, the identified trade-through or trade-at transaction is used to tabulate trade-through or trade-at data for a plurality of option limit orders placed by the customer. Fulfillment data for the plurality of option limit orders is also tabulated, and the tabulated fulfillment data is compared to the tabulated trade-through or trade-at data.

In some embodiments, a determination is made as to a set of option limit orders that are in effect during a trading day, each of the option limit orders including information identifying a respective desired option and information that indicates a respective limit price for the option limit order. Options trading information is received that is indicative of options trading activity on a plurality of exchanges during the trading day. After closing of the trading day, at least one of trade-through data and trade-at data is generated for the determined set of option limit orders based on the received options trading information.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 5 is a table illustrating an exemplary data structure of a limit order database for use in the present invention;

FIGS. 5A and 5B are illustrative user interfaces which may be displayed on an operator device of the system of FIG. 1;

DETAILED DESCRIPTION

Figure 1:
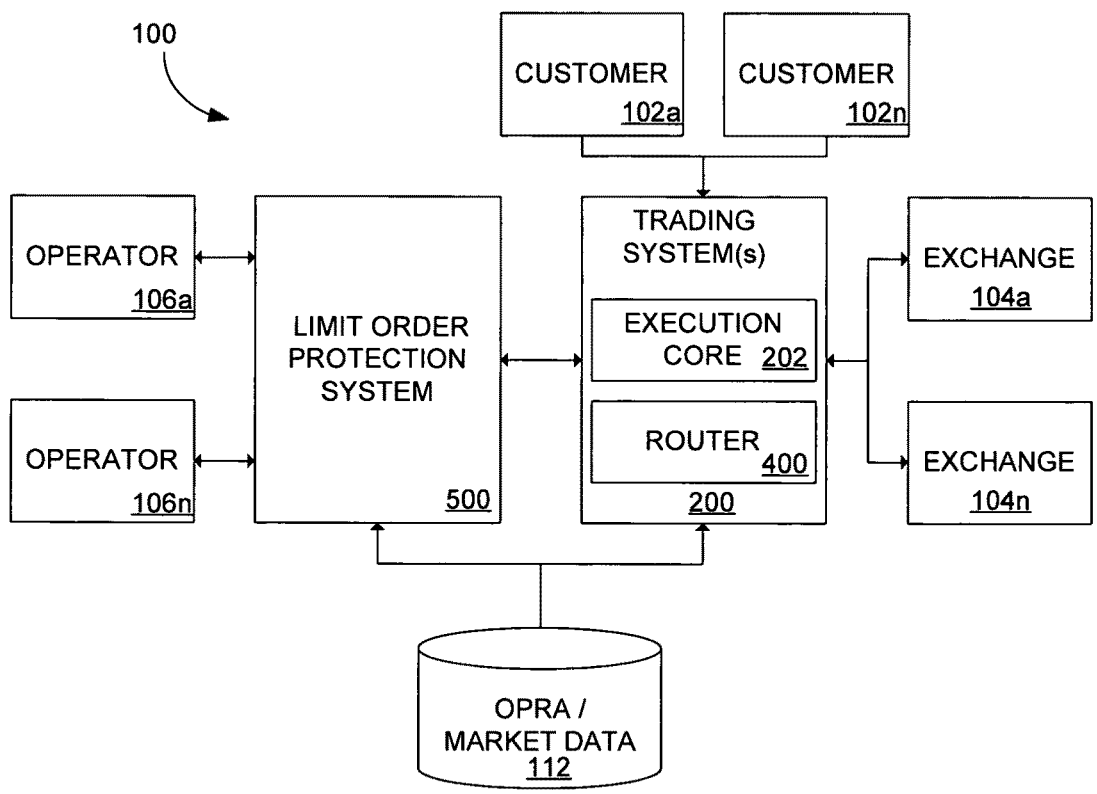
FIG. 1 is a block diagram of a system consistent with the present invention.

Applicants have recognized that there is a need for a system, method, apparatus, computer program code, and means to monitor and evaluate options limit order trading activity.

For the purposes of describing features of embodiments of the present invention, a number of terms are used herein. For example, the term "option" is used herein to refer to a contract which gives a buyer the right, but not the obligation, to buy or sell shares of the underlying security or index at a specific price for a specified time. In the description presented herein, the underlying securities described are equity securities or "stocks". Stock option contracts generally are for 100 shares of the underlying stock.

As used herein, the term "option order" refers to orders involving offers to purchase or sell securities commonly known as "options". As used herein, each option order includes a number of terms defining the offer to purchase or sell. For example, an option order may include a customer identifier (identifying the party offering to purchase or sell), a symbol (identifying the underlying security associated with the option order, referred to as the "underlyer"), an amount or size of the order (identifying the number, typically in lots of 100, of options desired to be purchased or sold). Each option order may also include information identifying a type of the order. For example, the option order may be immediately executable (e.g., be a market or marketable limit order), or it may have special conditions or instructions associated with the order. Finally, each order may also include information identifying an expiration date of the option contract.

As used herein, the term "option limit order" refers to an option order that specifies a limit price.

As used herein, the terms "exchange" or "options exchange" refer to any securities exchange which lists and facilitates the trading of options. For example, currently in the U.S., listed options are traded on the following national securities exchanges: the CBOE (exchange symbol "W"), the AMEX (exchange symbol "A"), the PCSE (exchange symbol "P"), the ISE (exchange symbol "I") and the PHLX (exchange symbol "X"). Embodiments of the present invention may be used to route and facilitate trading of options on other exchanges as well (including non-U.S. exchanges), and the terms "exchange" or "options exchange" are not intended to be limited to the above-identified exchanges.

As used herein, the term "specialist" includes registered competitive market makers, specialists, primary market makers and other registered securities dealers which maintain firm bids and offers by standing ready to buy or sell contracts of securities and which announce their pricing throughout the day.

As used herein, the term "trade-through transaction relevant to an option limit order" refers to a transaction which (a) occurs while the option limit order remains at least partially unfilled; (b) occurs at an exchange other than the exchange to which the option limit order was forwarded for execution; (c) involves the option specified in the option limit order; and (d) occurs at a better price than the price specified in the option limit order.

As used herein, the term "trade-at transaction relevant to an option limit order" refers to a transaction which (a) occurs while the option limit order remains at least partially unfilled; (b) occurs at an exchange other than the exchange to which the option limit order was forwarded for execution; (c) involves the option specified in the option limit order; and (d) occurs at the price specified in the option limit order.

As used herein, the term "trade-through data for an option limit order" refers to data which indicates a number of contracts included in at least one trade-through transaction relevant to the option limit order.

As used herein, the term "trade-at data for an option limit order" refers to data which indicates a number of contracts included in at least one trade-at transaction relevant to the option limit order.

As used herein, the term "fulfillment data" refers to data which indicates a number of contracts filled for an option limit order.

As used herein, the term "generating an alert" refers to displaying to a user information that indicates occurrence of a trade-through transaction or a trade-at transaction, associating information regarding the trade-through or trade-at transaction with an option limit order and/or providing an indication that action is or may be required.

In general, and for the purposes of introducing concepts of embodiments of the present invention, option limit order trading activity is monitored and evaluated pursuant to embodiments of the present invention as follows. A customer submits an option limit order to a broker, requesting execution of the option limit order. A trading system, upon receipt of the order, timestamps the order and captures the terms of the order (e.g., including information identifying the customer, the requested product, price, quantity, and limit price). A limit order protection system associated with the trading system receives a real time feed of market data. So long as the option limit order remains at least partially unfilled, the limit order protection system monitors the market data to detect occurrence of trade-through and/or trade-at transactions relevant to the option limit order. In some embodiments, when a trade-through transaction or a trade-at transaction is detected, the limit order protection system generates an alert, which may be displayed to an operator of the limit order protection system, of the trading system, and/or to the customer.

In some embodiments, the monitoring and evaluation of option limit order trading activity is further enhanced through the use of a routing system such as the system described in the above referenced U.S. patent application Ser. No. 8,140,420.

In some embodiments, a number of execution quality and analysis reports may be generated based on the detection of trade-through and/or trade-at transaction and/or based on alerts that were generated as described above. This may allow the broker and the broker's customers to monitor and summarize option limit order trading activity and quality. The reports generated may include tabulations of trade-through and/or trade-at data for groups of option limit orders placed by a single customer. The reports generated may also include fulfillment data for the groups of option limit orders. In some embodiments, the fulfillment data may be compared to the trade-through and/or trade-at data. The tabulation of trade-through, trade-at and/or fulfillment data may be based on batch processing of information instead of or in addition to processing of data in real time. The data analyzed to produce the tabulation may be received partly or entirely on a batch basis.

Other features and advantages will be apparent to those skilled in the art.

Embodiments of the present invention will now be described by first referring to FIG. 1 where a block diagram of one embodiment of a trading network 100 is shown. As shown, trading network 100 includes a number of different components which cooperatively operate to process, route and execute option orders pursuant to some embodiments of the present invention. The components further cooperatively operate to allow the monitoring and analysis of the trading of option limit orders.

As depicted, trading network 100 includes a limit order protection system 500 in communication with a trading system 200, a source of market data 112, and one or more operator devices 106. Trading system 200 is in communication with one or more customer(s) 102, one or more exchange (s) 104 and source of market data 112. Trading system 200, in some embodiments, includes an execution core 202 and a router 400. Execution core 202 may be any trade execution software, systems and/or devices which are configured to receive customer orders and process them to execute orders on behalf of customers. For example, execution core 202 may be the REDI® product offered by Spear, Leeds & Kellogg (a division of Goldman Sachs & Co.) and which provides integration of option quotes with rapid order entry and position management. Other suitable execution cores may also be used. In some embodiments, execution core 202 functions to timestamp orders when received and to assign an order identifier or sequence number to each order.

In some embodiments, a router 400 is provided as part of trading system 200. Router 400 is configured to receive option orders from trading system 200 and route them to, an appropriate options exchange for execution. For example, router 400 may be configured to apply one or more routing rules to each option order to route each order in an desired manner.

Although a single limit order protection system 500 and a single trading system 200 are shown in FIG. 1, any number of these devices may be included in trading network 100. For example, in one embodiment, a number of different trading systems 200 are in communication with limit order protection system 500 to allow multiple trading systems to monitor and analyze limit order trading pursuant to embodiments of the present invention. Similarly, any number of market data sources 112, customer devices 102, exchange devices 104 or any other device described herein may be included in the trading network 100 according to embodiments of the present invention. In some embodiments, limit order protection system 500 is utilized in conjunction with trading systems 200 which do not utilize a router 400.

Each of the devices of network 100 may be formed of components or other devices capable of performing the various functions described herein. For example, a customer device 102 may be a computing device such as a Personal Computer (PC), a laptop, a telephone, or other device associated with a customer. As used herein, the term "customer" may refer to, for example, an individual or other entity that buys and sells securities (and, pursuant to some embodiments of the present invention, options). For example, a customer operating a customer device may be a broker or other entity desiring to purchase or sell options using features of embodiments of the present invention. The broker or other entity may be operating on behalf of the ultimate purchaser of the securities.

An exchange device 104 may be any computing device(s) operated by or on behalf of one or more securities exchanges. In one particular embodiment, exchange devices 104 are devices or systems operated by or on behalf of exchanges which facilitate the trade of options. For the purposes of describing features of embodiments of the present invention, the five U.S. exchanges identified above will be referenced herein. Each of these exchanges may be in communication with other devices described herein using techniques known in the art. For example, the five U.S. exchanges are in communication with a central entity (the Options Clearing Corporation, or "OCC") which acts as a central clearing organization to process option contract trades. In general, the OCC receives information from the exchanges after the completion of trades, and operates to ensure trades are completed and settled pursuant to their terms.

Each exchange device 104 may include one or more operator terminals allowing specialists or traders at the exchange to respond to option orders received and to complete an option order pursuant to its terms.

Market data 112 may be any of a number of different types of options market data received from a variety of data sources and which can be used to facilitate option transactions. For example, in the U.S., intra-day option pricing data is provided by the Option Price Reporting Authority (OPRA). In some embodiments, market data 112 includes a feed of OPRA data. In some embodiments, this OPRA data feed is received by limit order protection system 500 and/or trading system(s) 200 substantially in real-time. This OPRA data feed provides option pricing from each of the options exchanges in the U.S. Those skilled in the art will recognize that other types of market data sources may also be used to assist in the processing and routing of transactions as described herein. For example, daily or monthly transaction volume information may be retrieved from the OCC or other sources and used to support routing decisions. As another example, daily pricing data may be retrieved from different specialists or traders. Market data 112 may be received by limit order protection system 500 and/or trading system(s) 200 on a regular basis or substantially in real-time.

Limit order protection system 500 may be any computing device which is capable of performing the various functions described herein. For example, in some embodiments, limit order protection system 500 may be configured as a Web server adapted to exchange information with operators 106, trading system(s) 200, and sources of market data 112. In some embodiments, limit order protection system 500 is a back office system operated by (or on behalf of) the same entity which operates trading system(s) 200, allowing the entity to amass, monitor, and evaluate options order execution data for trade requests received from its customers. In some embodiments, limit order protection system 500 is operated by (or on behalf of) one entity while trading system(s) 200 are operated by (or on behalf of) other entities. For example, a service provider may operate limit order protection system 500 as a fee-based service, allowing a number of different brokers to interact with the system and to utilize features of the limit order protection system.

As used herein, devices (e.g., limit order protection system 500, operator devices 106, exchanges 104, customer devices 102 and market data sources 112) may communicate, for example, via one or more communication networks. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, communication between some or all of the devices of network 100 may be via a temporary computer communication channel (e.g., a logic path through which information can be exchanged). In other words, the communication channel between various devices may be established and discontinued as appropriate. For example, trading system 200 may exchange information with limit order protection system 500 only when communication is necessary to transmit order or execution data to limit order protection system 500.

According to some embodiments, some or all of the devices communicate with other devices via a public computer communication network. That is, at least a portion of the communication network may be accessed by devices other than the devices depicted in FIG. 1. Note, however, that the information exchanged between limit order protection system 500 and other devices of FIG. 1 may be encrypted or otherwise protected to prevent a third party from accessing, manipulating, understanding and/or misusing the information. In some embodiments, some or all of the devices may communicate over a private network.

Further details of some embodiments of limit order protection system 500 will be discussed further below in conjunction with FIGS. 4-6. First, however, reference is made to FIGS. 2 and 3 wherein processes for monitoring and evaluating option limit order trading activity are depicted. The flow charts in FIGS. 2 and 3 do not imply a fixed order to the steps, and embodiments of the present invention can be practiced in any order that is practicable. Some or all of the steps of the processes shown in FIGS. 2 and 3 may be performed, for example, by, or on behalf of, a trading entity or service provider operating limit order protection system 500 in conjunction with other devices (e.g., such as trading system 200).

Figure 2:
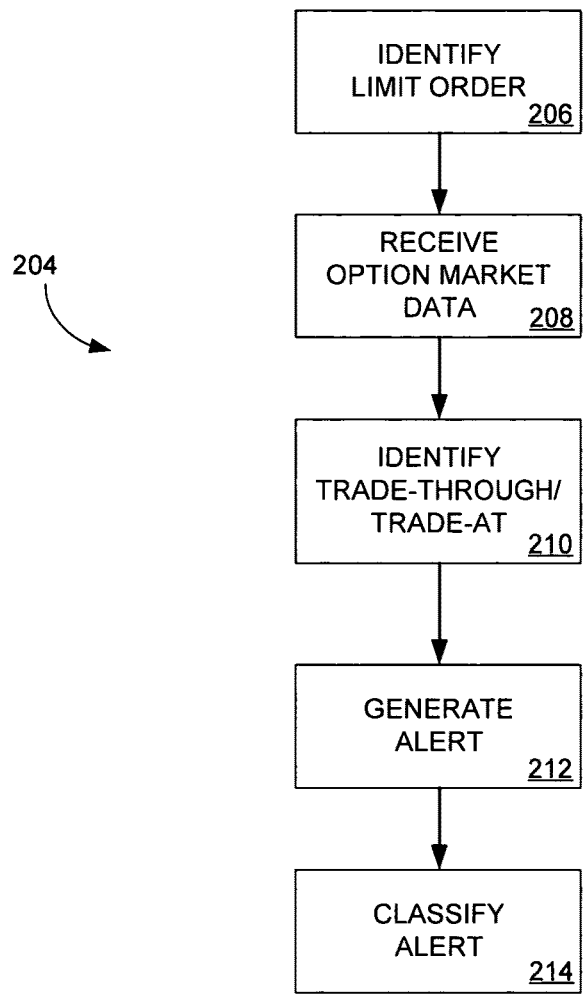
FIG. 2 is a flow diagram illustrating an exemplary process for monitoring and evaluating limit order trading activity pursuant to one embodiment of the present invention.

A process 204 depicted in FIG. 2 begins at 206 where an option limit order to be monitored is identified. For example, an option limit order may be identified by being received from a customer. In some embodiments, this option limit order is received from trading system 200 after it has been submitted to trading system 200 by a customer. The option limit order may include details specifying the terms on which the customer wishes the order to be completed. For example, a typical option limit order will include information specifying the customer submitting the order, the product to be traded (e.g., a put or a call of a particular security underlyer having a particular expiration and strike price), the quantity of contracts to be traded, a limit price, and any restrictions on the order (e.g., good for the day, etc.). In some embodiments, the information specifying the customer will include a customer name, account number, and branch identifier (if any). In some embodiments, an order identifier or sequence number is assigned to the option limit order to uniquely identify the order. In some embodiments, the option limit order is time stamped when it is received by trading system 200.

If the option limit order is newly received by the trading system 200, the router 400 may select an exchange 104 on which the option limit order is to be executed and the option limit order may be forwarded to the selected exchange in accordance with practices described in the above referenced U.S. Pat. No. 8,140,420.

At 208, a feed of real time or substantially real time option market data is received. This option market data may be retrieved, for example, from a market data source 112 such as an OPRA data feed. The option market data may include all trading transactions which occur on all options exchanges. The option market data may also include BBO (best bid and offer) data for all options exchanges and/or NBBO (national best bid and offer) data. If necessary, the limit order protection system 500 may be configured to synthesize NBBO data from exchange BBO data received in the market data feed.

Processing at 208 may include classifying the option limit order by comparing the limit price to NBBO and/or BBO information effective at the time the order was received. For example, in one embodiment, processing at 208 may include classifying limit orders into one of four categories. "Type 1" orders are orders that better the NBBO. "Type 2" orders are orders that are equal to the NBBO and better the BBO at the exchange to which they are directed. "Type 3" orders are orders that are within an enhanced NBBO (between the worst bid/offer). "Type 4" orders are all other orders. These classifications may be used to determine a service standard that is applicable to the option limit order or for other purposes. For example, these classifications may be used to classify various types of failures to satisfy a customer service standard. An option limit order may be reclassified if the limit price is changed after the order is placed.

Processing continues at 210 where the option market data received from the market data source is monitored to detect and identify trade-at and/or trade-through transactions that are relevant to the option limit order. It is assumed for the purposes of this example that at least one trade-at or trade-through transaction is identified, but it should be recognized that such will not always be the case. The market data from which the trade-at or trade-through transaction was identified may include data relating to market conditions or exchange-specific information such as whether the markets at the time of execution were fast, whether the transaction was a book order, auto eligible, late, or the like. Market size at the time may also be provided. Monitoring with respect to the option limit order may continue throughout the life of the order, i.e., until it is fully executed, deleted or cancelled.

Processing may continue at 212, where, in response to identification of the trade-at or trade-through transaction, an alert is generated. The generation of the alert may include logging information regarding the trade-at or trade-through transaction in association with the option limit order. Logging the alert may include adding or changing entries in the limit order database 600 and/or the alert database 700 which are described below. In addition or alternatively, generation of the alert may include providing an indication of the alert on a display provided to a user, or otherwise indicating that an action should be taken.

Processing may continue at 214 where the alert may be classified. For example, the alert may be classified as either "active" or "inactive". An alert may be classified as inactive because it was generated within a waiting period (e.g. 90 seconds) after the option limit order was received from the customer. An alert may also be classified as inactive because the option limit order was completely executed or cancelled within a predetermined period (e.g. 90 seconds) after the alert was generated. An alert may also be classified as inactive because it was generated in response to a trade-at or trade-through transaction which occurred at a "non-leading" exchange. A "leading" exchange may be an exchange that had 50% or more of the aggregate contract volume in all options for the underlyer of the option limit order in question during a predetermined preceding period such as the preceding calendar month. If no exchange had at least 50% of such volume, then the two exchanges having the highest volume during the preceding period may be considered "leading" exchanges. A "non-leading" exchange is an exchange that is not a leading exchange.

The process of FIG. 2 may be modified so as to filter out (i.e., disregard, not generate an alert in response to) certain trades, such as spreads, straddles, buy-writes, and market-maker trades.

In addition to or instead of detecting and identifying trade-through and/or trade-at transactions in real time, as described above, some embodiments may include capabilities for storing and analyzing information regarding trade-at and trade-through transactions and for characterizing option limit order trading performance.

Figure 3:
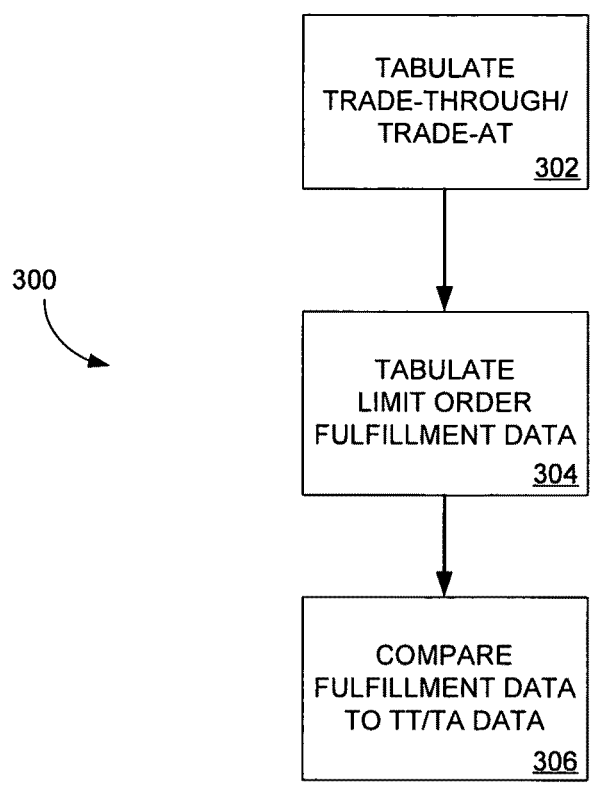
FIG. 3 is a flow diagram illustrating an exemplary process for tabulating and comparing limit order fulfillment data with trade-through and/or trade-at data.

A process 300 for analyzing and evaluating option limit order trading is depicted in FIG. 3. Process 300 begins at 302, where data regarding trade-at and/or trade-through transactions is tabulated. The tabulation may be directed to all limit orders placed by a given customer during a given period, such as a day, a week, or a month. In some embodiments, trade-at transaction data and trade-through transaction data is tabulated separately. The tabulation may be based on alert data stored during the process 204 of FIG. 2.

Processing continues at 304, where fulfillment data is tabulated in regard to option limit orders placed by the customer during the period in question. In some embodiments, fulfillment data is only tabulated for option limit orders for which alerts were generated. In some embodiments, fulfillment data is tabulated only for option limit orders for which alerts were classified as active.

Processing continues at 306, where the tabulated fulfillment data is compared to either or both of the trade-through and trade-at data tabulated at 302. For example, a total of contracts filled for a group of option limit orders may be divided by the number of contracts for which trade-at or trade-through transactions were identified to generate a performance measurement.

A specific example of a process for calculating a performance measure will now be described. The process will be described with respect to trade-through transactions, but it should be understood that an essentially similar process may be performed with respect to trade-at transactions.

Initially a performance measure is calculated for each option limit order for which a trade-through was identified. (Trade-throughs associated with inactive alerts may be excluded.) For the option limit order, a number of contracts hypothetically filled by the trade-through or trade-throughs is determined, but capped at the number of unfilled contracts at the time of the trade-through to prevent over counting. Once applied to the order, the print may be applied to then outstanding orders traded through by the print, in price/time priority, until the print contracts are exhausted. The number of contracts actually filled for the option limit order that day is also determined. Then the lesser of the hypothetically filled contracts and the actually filled contracts is divided by the number of hypothetically filled contracts to provide a performance measurement for the traded-through option limit order.

To calculate a performance measurement for all traded-through option limit orders in a group of limit orders (e.g. all option limit orders for a given customer for a given period of time), a sum is obtained of the lesser of the hypothetically filled contracts and the actually filled contracts for each of the traded-through option limit orders, and a second sum is obtained of all of the hypothetically filled contracts for the traded-through option limit orders. Then the first sum is divided by the second sum to arrive at a performance measurement for the group of option limit orders.

Those of ordinary skill in the art will understand from the foregoing discussion that other performance measurement calculations may be performed based on the trade-at and trade-through data collected in one or both of the processes of FIGS. 2 and 3.

Figure 4:
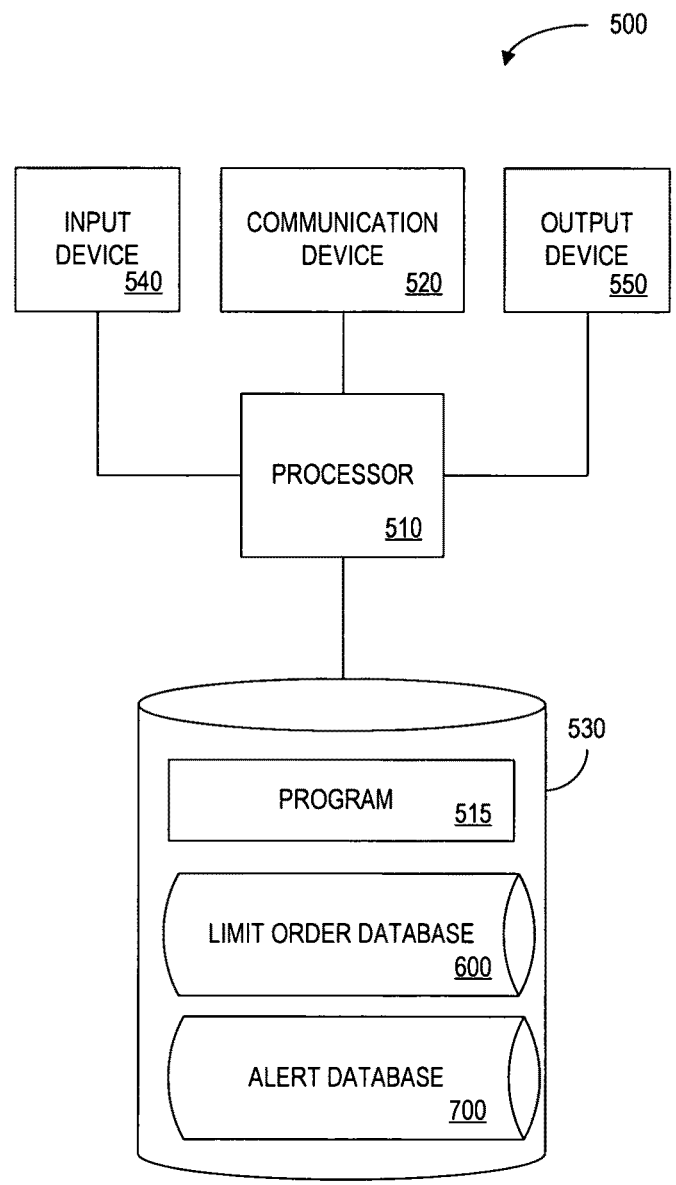
FIG. 4 is a block diagram of one embodiment of a limit order protection system for use in conjunction with the system of FIG. 1.

Reference is now made to FIG. 4 where an embodiment of limit order protection system 500 is shown. As depicted, limit order protection system 500 includes a computer processor 510 operatively coupled to a communication device 520, a storage device 530, an input device 540 and an output device 550. Communication device 520 may be used to facilitate communication with, for example, other devices (such as user devices 102, exchanges 104, trading system 200 and sources of market data 112). Input device 540 may comprise, for example, a keyboard, a keypad, a mouse or other pointing device, a microphone, knob or a switch, an infra-red (IR) port, a docking station, and/or a touch screen. Input device 540 may be used, for example, to enter information (e.g., information regarding routing rules or the like). Output device 550 may comprise, for example, a display (e.g., a display screen), a speaker, and/or a printer.

Storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 530 stores one or more programs 515 for controlling processor 510. Processor 510 performs instructions of program 515, and thereby operates in accordance with the present invention. In some embodiments, program 515 may, in addition to implementing limit order monitoring and analysis, include a rule-based engine which applies routing rules to customer orders. In some embodiments, program 515 may be configured as a neural-network or other type of program using techniques known to those skilled in the art to achieve the functionality described herein. In some embodiments, program 515 may provide the functionality of each of the major components of trading system 200, including execution core 202 and router 400.

Storage device 530 also stores databases, including, for example, a limit order database 600 and an alert database 700. Other databases may also be provided (e.g., if the same device provides the functionality of the router and the execution core, order and execution data may also be stored in storage device 530 as well). An example of a limit order database 600 is described below in conjunction with FIG. 5, and an example of an alert database 700 is described below in conjunction with FIG. 6. Those skilled in the art, upon reading this disclosure, will understand that a number of different forms of trade-at and trade-through data and various reports regarding monitoring and analysis of limit order trading activity may be utilized.

Referring now to FIG. 5, a table represents a limit order database 600 that may be stored at (or accessible by) limit order protection system 500. This database is described in detail below and depicted with exemplary entries in the accompanying figure. As will be understood by those skilled in the art, the schematic illustrations and accompanying descriptions of the databases presented herein are exemplary arrangements for stored representations of information. A number of other arrangements may be employed besides those suggested by the table shown. Similarly, the illustrated entries of the database represent exemplary information only. Those skilled in the art will understand that the number and content of the entries can be different from those illustrated herein. Other example data and combinations of data are depicted in the user interfaces described below in conjunction with FIGS. 5A, 5B, 7, 7A and 8.

Limit order database 600 (as depicted) includes entries identifying a number of pieces of information regarding option limit orders which were received by trading system 200. This quality data may be generated on a substantially real-time basis throughout the trading day to allow brokers and/or their customers to monitor option limit order trading and to allow brokers to take corrective action on behalf of their customers. In some embodiments, the type of data stored in the limit order database may be varied based on customer-specified rules. In some embodiments, the type of data stored in the limit order database is generally fixed by the entity operating the limit order protection system 500.

As depicted, the table defines a number of fields 602-612 for each of the entries. The fields specify: an order identifier 602, a time order received 604, order terms 606, customer information 608, alerts 610, and quantity filled 612. The data populating database 600 is stored and captured at several different times. For example, the order identifier 602, time order received 604, order terms 606, and customer information 606, are captured and stored at or near the time the order is received. The data for the alerts 610 may be captured and stored, for example, at the time an alert is generated. The quantity filled data may be captured and stored at a time or times when the option limit order is partially or completely filled.

Order identifier 602 (otherwise referred to as a sequence number) may be alphanumeric data uniquely identifying a particular order received by trading system 200. This identifier may be, for example, generated by execution core 202 when the order is received. Time order received 604 may be alphanumeric data identifying the time and date at which the order identified by order identifier 602 is received. Time order received 604 may be generated by the execution core 202 when the order is received. Order terms 606 include data specifically identifying the terms of a particular customer order, including the type of order, the size, the underlyer, the expiration date, a price, and an exchange (if the customer specifies a particular exchange).

Customer information 608 includes data identifying a particular customer for which option limit order trading activity is monitored and analyzed using embodiments of the present invention. The data may be alphanumeric data used to uniquely identify a particular customer.

Alert data 610 includes one or more alert identifiers that identify an alert or alerts that have been generated with respect to the option limit order in question as a result of a trade-at or trade-through transaction relevant to the option limit order. The alert data may include alphanumeric data that uniquely identifies an alert generated with respect to the option limit order. As will be seen, each alert identifier provides a link to the alert database 700, from which information may be obtained regarding the trade-at or trade-through transaction which caused the alert to be generated.

Although alert identifiers are shown as present for each of the three example limit order option records depicted in FIG. 5, it will often be the case that no alert has been generated with respect to a particular option limit order, in which case no alert identifier would be entered in the record for that option limit order. It may also be the case that the depicted limit order database may be used only for limit orders for which alerts have been generated.

Quantity filled information 612 includes information that indicates to what extent, if at all, the option limit order has been filled. The indication "none" may initially be entered in this field upon receipt of the option limit order and the field may be updated upon partial or complete filling of the option limit order.

In some embodiments, the limit order database 600 may be integrated with a database that also includes information concerning other types of orders in addition to limit orders.

Example user interface screens will now be described by reference to FIGS. 5A and 5B. The user interface screens of FIGS. 5A and 5B may be displayed, for example, on display devices associated with operator devices 106, allowing system operators to interact with, review, and monitor option limit order trading data captured using embodiments of the present invention. Operators may take remedial action based on the data and may also enter further data clarifying or commenting on transactions.

Referring to FIGS. 5A and 5B, each of these drawings shows an example of a user interface 620 which depicts a display of records related to open option limit orders which are being monitored by an operator. The user interface 620 includes an information section 622 which displays information relating to specific transactions for which trade-at or trade-through alerts have been generated. The user interface 620 further includes an action section 624 by which the operator may initiate an action and/or enter a comment or other input regarding a selected one or ones of the transaction entries in the information section 622. The action section 624 shown in FIG. 5B depicts examples of indications which may be entered by an operator. The information displayed in the information section 622 may be provided, at least in part, from the limit order database 600 described above and from the alert database 700 referred to above and described below.

Figure 6:
FIG. 6 is a table illustrating an exemplary data structure of an alert database for use in the present invention.

Referring now to FIG. 6, a table represents an alert database 700 that may be stored at (or accessible by) limit order protection system 500. This database is described in detail below and depicted with exemplary entries in the accompanying figure.

The alert database 700 (as depicted) includes entries which provide information concerning alerts of the type generated at 212 in the process of FIG. 2. The alert database also includes information regarding trade-at or trade-through transactions that caused the alerts to be generated. This information may be captured and stored during monitoring of the real time market data feed by the limit order protection system 500.

As depicted, the table defines a number of fields 702-714 for each of the entries. The fields specify: an alert identifier 702, an alert status 704, an indication 706 as to whether the alert was generated as the result of a trade-through or a trade-at transaction, a price 708 at which the transaction occurred (in the case of a trade-through transaction; in the case of a trade-at transaction the price, by definition, was the limit price of the option limit order), a time 710 at which the trade-through or trade-at transaction occurred, an exchange 712 at which the trade-at or trade-through transaction was executed, and flags 714.

As noted above in connection with the limit order database, the alert identifier 702 may be alphanumeric data that uniquely identifies a particular alert. The alert status 704 indicates whether the alert is currently classified as active or inactive. The indication 706 is either "TT" which indicates that the alert was generated in response to a trade-through transaction or "TA" which indicates that the alert was generated in response to a trade-at transaction.

The price 708 indicates the price at which a trade-through transaction occurred. The time 710 indicates the date and time of occurrence of the trade-at or trade-through transaction. The exchange 712 indicates the exchange at which the trade-at or trade-through occurred (which will never be the exchange to which the option limit order was forwarded for execution). Flags 614 includes data identifying any anomalous market conditions or other information regarding the execution of the trade-at or trade-through transaction. For example, flags 614 may include data specifying that the market conditions at execution included: a fast market; a late print; a stale quote; cross/locked; floor broker discretion; BD trades; bettered NBBO; trade in processing, etc. Other data, such as quantity of contracts in the associated trade-at or trade-through, may also be captured and analyzed as well.

Example user interface screens will now be described by reference to FIGS. 7, 7A and 8. The user interface screens of FIGS. 7, 7A and 8 may be displayed, for example, on display devices associated with operator devices 106, allowing system operators to interact with, review, and monitor option limit order trading data captured using embodiments of the present invention. Operators may take remedial action based on the data and may also enter further data clarifying or commenting on transactions.

Figure 7:
FIGS. 7, 7A and 8 are illustrative user interfaces which may be displayed on an operator device of the system of FIG. 1.

Referring first to FIG. 7, a user interface 800 is shown which depicts a display of records related to open option limit orders which are being monitored by an operator. The open option limit orders are associated with a particular customer (customer identifier C1001). Each of the records shown in the user interface 800 is associated with a particular open option limit order, for which the order number is displayed in column 802. The order terms are displayed in column 804. Column 806 contains data relating to "leaves", i.e., the portion of the order which remains open. As seen from the drawing, each record contains an indication in column 808 as to whether there has been a trade-at or trade-through transaction relevant to the open limit order. A comment field is provided in column 810 to permit entry of a comment to indicate why remedial action may or may not be appropriate. For example, in some embodiments no remedial action is required when the trade-at or trade-through occurred at a non-leading exchange.

Figure 7A:
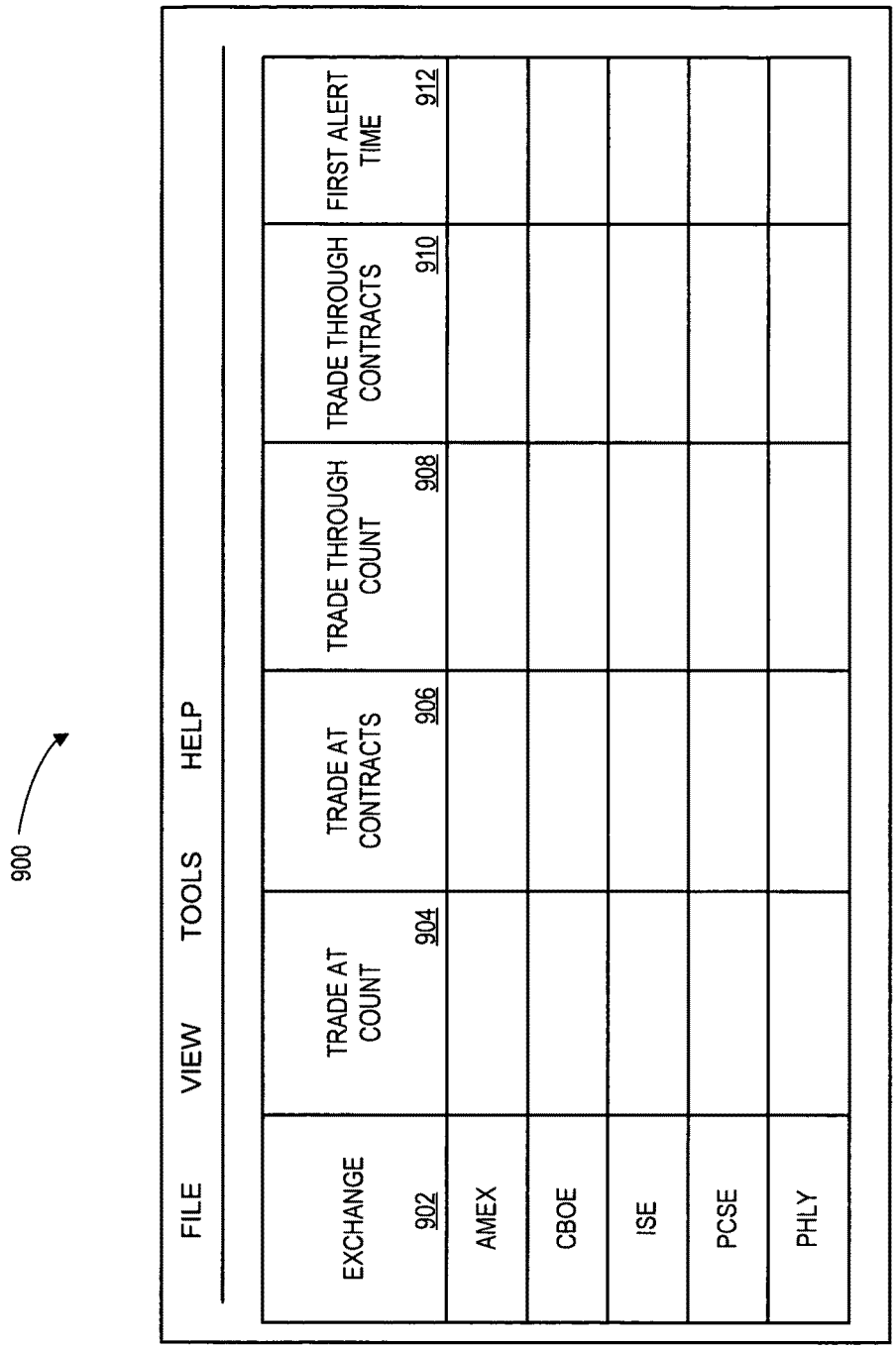

Referring to FIG. 7A, a further user interface 900 is depicted which may be presented to an operator to view additional information about an open limit order listed in the user interface of FIG. 7. The user interface of FIG. 7A may be integrated with the interface of FIG. 7 or may be provided separately as depicted in FIG. 7A. The information provided in user interface 900 is arranged in columns that include: (a) Column 902 to indicate the exchange at which a trade-at or trade-through occurred; (b) column 904 to indicate the number of trade-at transactions; (c) column 906 to indicate the number of contracts involved in the trade-at transactions; (d) column 908 to indicate the number of trade-through transactions; (e) column 910 to indicate the number of contracts involved in the trade-through transactions; and (f) column 912 to indicate the time at which the first alert was generated with respect to the trade-at or trade-through.

Figure 8:

Referring to FIG. 8, a further user interface 1000 is depicted which may be presented to an operator to view data generated by analyzing option limit order trading activity in accordance with embodiments of the invention. The analysis may initially have been performed in real time, or may have been based on a batch process.

The user interface 1000 includes a column 1002 which lists calendar months for which limit order protection performance is summarized. Column 1004 contains information regarding numbers of orders for which trade-throughs or trade-ats occurred. Column 1006 contains information regarding the total number of contracts covered by the orders enumerated in column 1004. Column 1008 presents percent filled statistics for the months in question for the traded-through or traded-at orders, and column 1010 presents applicable limit order protection standards.

Figure 9:
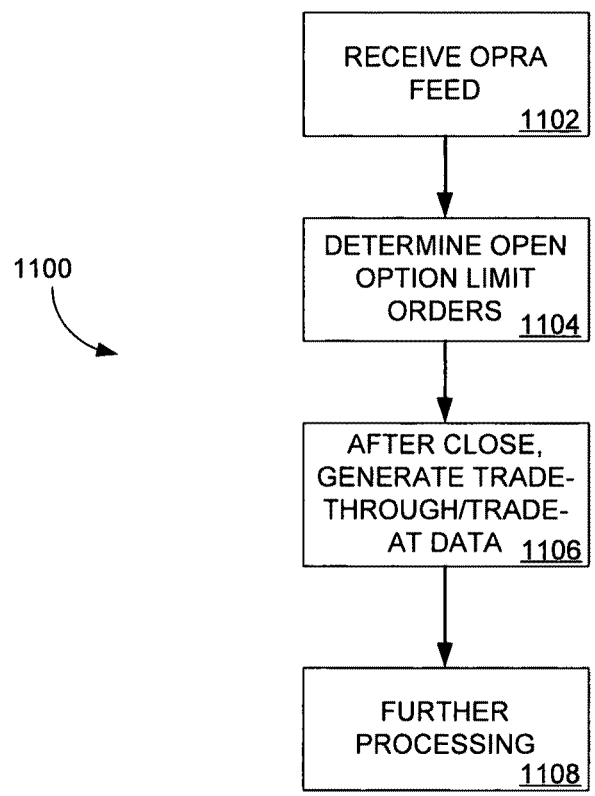
FIG. 9 is a flow diagram illustrating an exemplary process for evaluating performance relative to limit orders.

FIG. 9 depicts a process for evaluating limit order protection performance on the basis of batch processing. The flow chart in FIG. 9 does not imply a fixed order to the steps, and embodiments of the present invention can be practiced in any order that is practicable. Some or all of the steps of the process shown in FIG. 9 may be performed, for example, by, or on behalf of, a trading entity or service provider operating limit order protection system 500 in conjunction with other devices (e.g., such as trading system 200).

A process 1100 depicted in FIG. 9 begins at 206 which indicates receiving options trading information that is indicative of trading activity on a number of exchanges, such as all exchanges available for options trading. This options trading information may take the form of a real-time feed of intra-day option pricing data provided by OPRA. The data received in real time may be stored for subsequent analysis and use at the close of the trading day. Alternatively, information which describes all of the day's trading activity may be received in batch form at close of trading.

At 1104, it is determined what option limit orders are in effect (open) during the trading day. This determination may include carrying over from a previous trading day option limit orders that remain open. Records may be maintained as to the periods of time that the option limit orders are open. Records may also indicate whether and to what extent the option limit orders are filled.

Processing may continue at 1106, at which data is generated as to trade-ats and trade-throughs with respect to option limit orders in the set of open option limit orders determined at 1104. This may be done by analysis of the information regarding option trading activity obtained at 1102 and of the open option limit order information obtained at 1104. Before a determination is made as to open option limit orders that could hypothetically have been filled by trade-at or trade-through transactions, cancelled transactions may be purged from the trading activity information to prevent false hypothetical fills.

The processing at 1106 may include totaling all hypothetical fills separately by trade-at and trade-through, and for various categories such as by underlyer, by customer, for the day, or for a combination of such categories.

Further processing is indicated at 1108. This further processing may include determining as to each option limit order for which a trade-at or trade-through occurred whether the option limit order was subsequently filled or partially filled. The information regarding filling of traded-at or traded-through orders may be totaled and the resulting figures may be compared to the trade-at/trade-through data. For example, the total filled (by number of contracts, and capped to the extent of trade-ats or trade-throughs) may be divided by the total of trade-ats or trade-throughs (by number of contracts) to obtain a performance or satisfaction measurement that may indicate an extent to which a limit order protection guarantee has been satisfied. The calculation of the performance measurement may be as described above in connection with item 206 of FIG. 3.

Results of daily trade-at/trade-through analysis may be aggregated by week, month, quarter and/or year, and/or may be broken down by customer, exchange, time of day, etc.

Those skilled in the art will appreciate that other displays and actions may be presented and used to implement features of embodiments of the present invention. For example, the depicted displays may be modified and/or other displays may be provided to display to a user any or all of the data stored in the limit order database and the alert database described above. The data presented may be filtered by one or more of customer, time period, and trade-at or trade-through. Other data fields that may be displayed are hypothetical trade-at and hypothetical trade-through leaves quantities. The hypothetical trade-at leaves quantity may be defined as the open order quantity (or the open quantity at the start of the day in the case of a previous day order) less the running total of trade-at print contracts attributed to the order. The hypothetical trade-through leaves quantity may be defined as the open order quantity (or the open quantity at the start of the day in the case of a previous day order) less the running total of trade-through print contracts attributed to the order.

In exemplary embodiments described above, monitoring and analysis of option limit order trading has been performed in conjunction with receiving the orders for execution. However, as an alternative, monitoring and analysis of option limit order trading may be performed by an entity that is not involved with the trading activity, but rather performs monitoring and/or analysis based on trading data received from the trading entity as well as based on market data.

The analysis and/or monitoring need not be performed in real time, but may rather, for example, be performed in a batch mode at some time after the trading and/or ordering activity has occurred.

The limit order protection system may operate so as to automatically disregard potential trade-at or trade-through transactions that occur, for example, during anomalous market conditions, on a non-leading exchange, or under other circumstances under which the operator of the trading system does not undertake to provide limit order protection.

Although the present invention has been described with respect to a preferred embodiment thereof, those skilled in the art will note that various substitutions may be made to those embodiments described herein without departing from the spirit and scope of the present invention.

What is claimed is:

1. A processor-implemented method for monitoring and evaluating an option limit order, comprising:
   receiving an option limit order, said option limit order including information identifying a customer, information identifying a desired option, and information that indicates a limit price for said option limit order;
   classifying, by a processor, said option limit order into a category by comparing the limit price to National Best Bid and Offer data or Best Bid and Offer data effective at a time said option limit order was received,
   determining a service standard applicable to said option limit order based on the category;
   identifying, by the processor, at least one of a trade-through transaction relevant to said option limit order and a trade-at transaction relevant to said option limit order;
   generating, by the processor, an alert on the basis of said identified at least one of a trade-through transaction and a trade-at transaction; and
   indicating, by the processor, whether said alert was generated as a result of a trade-through transaction or a trade-at transaction.

2. The method of claim 1, further comprising classifying, by the processor, said alert as one of active and inactive, wherein said alert is classified as inactive when a corresponding trade-through transaction or trade-at transaction occurred within a predetermined period after an order time of said option limit order.

3. The method of claim 1, further comprising classifying, by the processor, said alert as one of active and inactive, wherein said alert is classified as inactive when said option limit order is filled within a predetermined period after occurrence of a corresponding trade-through transaction or trade-at transaction.

4. The method of claim 1, further comprising classifying, by the processor, said alert as one of active and inactive, wherein said alert is classified as inactive when a corresponding trade-through transaction or trade-at transaction occurred on a non-leading exchange.

5. The method of claim 1, wherein said information identifying a desired option further includes:
   a type of said order, a security underlier, an option expiration date, and a size of said order.

6. The method of claim 1, further comprising:
   disregarding said identified at least one of a trade-through transaction and a trade-at transaction in response to a market condition in effect at a time of the transaction.

7. The method of claim 1, wherein said at least one of a trade-through and a trade-at transaction occurs at a better price than the limit price for said option limit order.

8. The method of claim 1, further comprising classifying, by the processor, said alert as one of active and inactive, wherein the alert is classified as active when the alert is not classified as inactive.

9. A non-transitory processor-readable medium storing processor-issuable instructions to:
   receive an option limit order, said option limit order including information identifying a customer, information identifying a desired option, and information that indicates a limit price for said option limit order;
   classify the option limit order into a category by comparing the limit price to national best bid and offer data or best bid and offer data effective at a time said option limit order was received,
      wherein the category is used to determine a service standard applicable to said option limit order;
   identify at least one of a trade-through transaction and a trade-at transaction relevant to said option limit order;
   generate an alert in real time on the basis of the identified at least one of a trade-through transaction and a trade-at transaction; and
   indicate whether said alert was generated as a result of a trade-through transaction or a trade-at transaction.

10. The non-transitory processor-readable medium of claim 9, further comprising processor-issuable instructions to classify said alert as one of active and inactive, wherein said alert is classified as inactive when a corresponding trade-through transaction or trade-at transaction occurred within a predetermined period after an order time of said option limit order.

11. The non-transitory processor-readable medium of claim 9, further comprising processor-issuable instructions to classify said alert as one of active and inactive, wherein said alert is classified as inactive when said option limit order is filled within a predetermined period after occurrence of a corresponding trade-through transaction or trade-at transaction.

12. The non-transitory processor-readable medium of claim 9, further comprising processor-issuable instructions to classify said alert as one of active and inactive, wherein said alert is classified as inactive when a corresponding trade-through transaction or trade-at transaction occurred on a non-leading exchange.

13. The non-transitory processor-readable medium of claim 9, wherein said information identifying a desired option includes:
   a type of said order, a security underlier, an option expiration date, and a size of said order.

14. The non-transitory processor-readable medium of claim 9, further comprising instructions to:
disregard said identified at least one of a trade-through transaction and a trade-at transaction in response to a market condition in effect at a time of the transaction.

15. The non-transitory processor-readable medium of claim 9, wherein said at least one of a trade-through and a trade-at transaction occurs at a better price than the limit price for the option limit order.

16. The non-transitory processor-readable medium of claim 9, further comprising processor-issuable instructions to classify said alert as one of active and inactive, wherein the alert is classified as active when the alert is not classified as inactive.

17. An apparatus for monitoring and evaluating an option limit order, comprising:
a processor; and
a storage device in communication with said processor and storing instructions adapted to be executed by said processor to:
receive an option limit order, said option limit order including information identifying a customer, information identifying a desired option, and information that indicates a limit price for said option limit order;
classify said option limit order into a category by comparing the limit price to National Best Bid and Offer data or Best Bid and Offer data effective at a time said option limit order was received,
determine a service standard applicable to said option limit order based on the category of said option limit order;
identify at least one of a trade-through transaction and a trade-at transaction relevant to said option limit order;
generate an alert in real time on the basis of the identified at least one of a trade-through transaction and a trade-at transaction; and
indicate whether said alert was generated as a result of a trade-through transaction or a trade-at transaction.

18. The apparatus of claim 17, wherein said instructions further comprise instructions adapted to be executed by said processor to classify said alert as one of active and inactive, wherein the alert is classified as active when the alert is not classified as inactive.

\* \* \* \* \*